June 21, 1955     E. A. SOUTHAM ET AL     2,711,469
TOOL FOR APPLYING EDGE REINFORCEMENT
TO PAPER MAKING WOVEN WIRE BELT
Filed Feb. 25, 1952     2 Sheets-Sheet 1
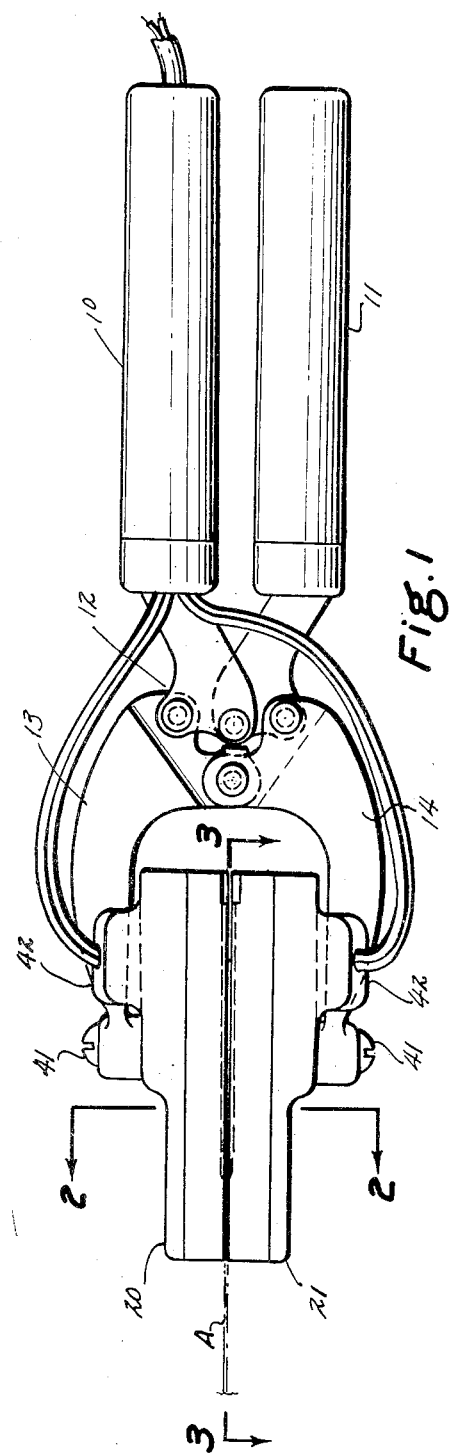
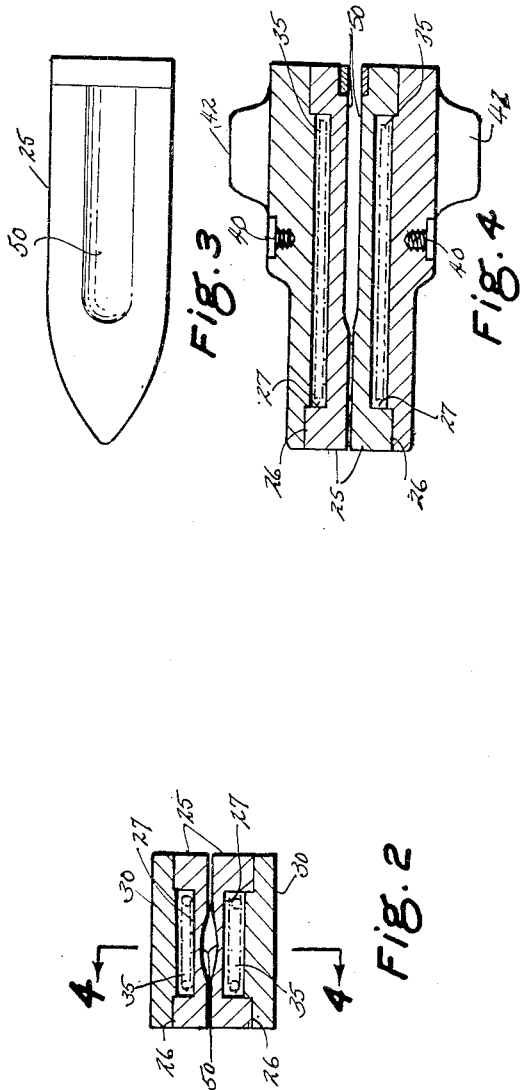
INVENTOR.
EARL A. Southam, Howell F. Davis
BY and George P. Wennes Jr.
Bates, Teare & McBean
Attorneys

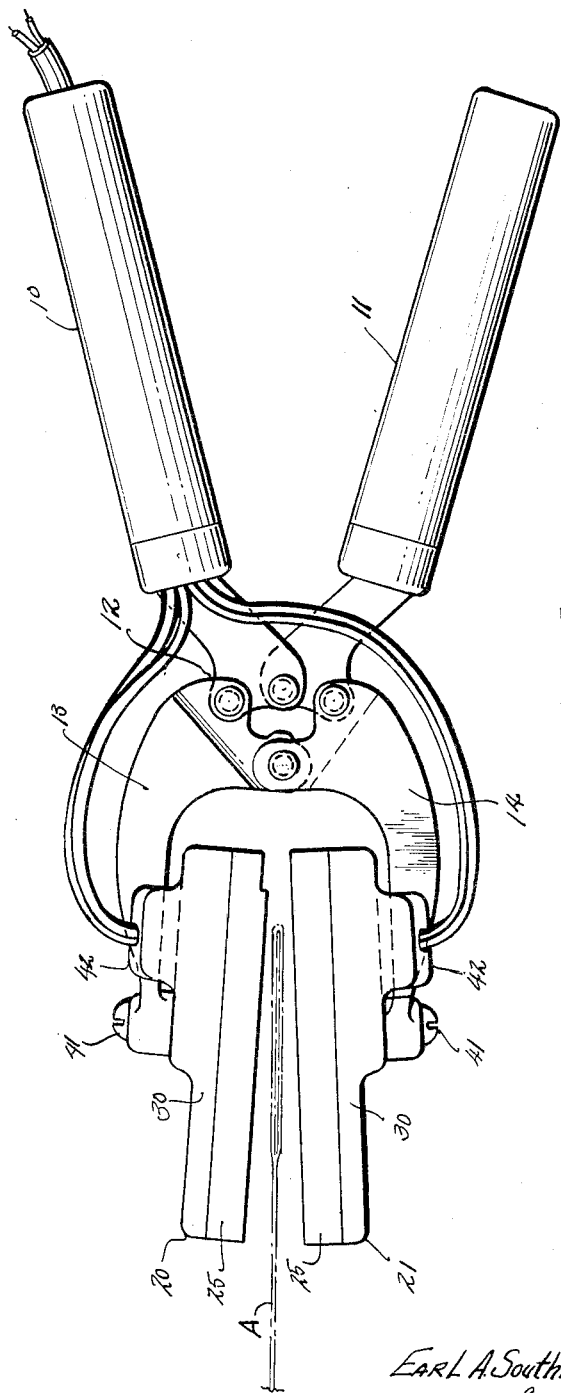

United States Patent Office 2,711,469
Patented June 21, 1955

2,711,469
TOOL FOR APPLYING EDGE REINFORCEMENT TO PAPER MAKING WOVEN WIRE BELT

Earl A. Southam, Cleveland, Howell F. Davis, Wickliffe, and George P. Wennes, Jr., Maple Heights, Ohio, assignors to The Lindsay Wire Weaving Company, Cleveland, Ohio, a corporation of Ohio Application February 25, 1952, Serial No. 273,254

2 Claims. (Cl. 219—21)

This invention relates to a tool for applying heat and pressure to a work piece and more particularly to a tool for applying a plastic edge reinforcement to paper making woven wire belts.

In the use of woven wire belts in Fourdrinier paper making machines it has been found that the belt sometimes fails at the edges or along the end of a transverse seam. The life of such a belt may be prolonged by reinforcing such failures in the belt fabric by applying thin sheets of thermoplastic material above and below the belt fabric and across the failure or seam and then applying pressure and heat sufficient to cause the plastic to flow into all of the interstices of the belt between the plastic sheets. In reinforcing belt failure repairs it is preferable to make the plastic reinforcement across the edges of the failure of materially greater thickness than on either side of the failure. A principal object of this invention is to provide a hand-operated tool for applying heat and pressure to thin plastic sheets from opposite sides of the belt.

Briefly, the invention embodies a hand-operated clamp having handles connected through a toggle-linkage to spaced clamp supports in such manner that by pressing the handles together the clamp supports positively move toward each other and becomes self-locking in a predetermined closed position. Each of the clamp supports carries an electrically heated clamping member with heat transmitting plates for pressing and heating thin plastic sheets against opposite sides of a woven wire fabric belt. Electrical heating elements are disposed within the body of each clamping member adjacent the corresponding heat transmitting plates in such manner that the entire clamping force is transmitted from the clamp supports through the clamping member and heat transmitting plates and not through the heating element. Suitable electrical leads extend from the electric heating element through the clamping member body and at least one of the handles for connection to a suitable source of electrical energy.

In the drawings,

Fig. 1 is a full view of the edge repair tool in clamped position about an assembly of a woven wire fabric belt and a plastic sheet shown in dotted lines;

Fig. 2 is a sectional view taken along the lines 2—2 through the clamping members in Fig. 1;

Fig. 3 illustrates in plan view the base of a clamping member with a shallow depression for providing a raised or thickened plastic reinforcement;

Fig. 4 is a sectional view taken along the lines 4—4 in Fig. 2 through the clamping members; and Fig. 5 is another full view of the edge repair tool in unclamped position about an assembly of woven wire fabric belts and plastic reinforcements shown in dotted lines therein.

Referring now to Fig. 1 of the drawings, there is shown in full view a hand-operated clamping tool having handles 10 and 11, connected to each other and to supports 13 and 14 through a toggle linkage 12 which becomes self-locking in a predetermined closed position. This type of toggle linked clamping device is known in the art and is particularly suitable to provide the pressure necessary to force the thin thermoplastic sheet material in heated form into the adjacent interstices of the woven wire fabric belt.

Each clamping support 13 and 14 is removably connected by means of a bolt 15 to corresponding clamping members 20 and 21. The clamping members 20 and 21 are in the form of elongated clamping shoes having adjacent mating faces adapted to meet along a common plane bisecting the space between the clamping supports 13 and 14. As best shown in the sectional views of Figs. 2 and 4 of the drawings, the clamping members 20 and 21 are preferably of two-part construction wherein one part is in the form of a heat transmitting plate 25 having an elongated depression 27 in its upper face formed by a raised marginal upstanding flange 26 which is adapted to support the other part or enclosure 30.

The surmounting enclosure 30 has substantially the same elongated shape and configuration as the plate 25 and is adapted to rest upon the upstanding plate flange 26 to form a closed elongated hollow cavity 31 between the plate 25 and the enclosure 30. This hollow cavity is adapted to enclose an electrical heating element 35 and its connections as shown in dotted lines in Figs. 2 and 4 of the drawings. The only points of structural contact between the enclosure 30 and the heating plate 25 are at the mating surfaces of the upstanding flange 26 and the marginal lower face surface of the surmounting enclosure 30. Thus, when the assembled clamping members 20 and 21 are each secured to the corresponding clamping supports 13 and 14 through their connecting bolts, the clamping pressure is distributed through the surmounting enclosure 30 and the mating upstanding flange 26 to the heating plate 25 and thence to the belt or other material placed between the clamping members. The electrical heating elements 35, which are encased within the hollow cavity defined by the elongated depressions 27 and the surmounting enclosure 30, are completely isolated from any stress or strain from the clamping supports.

This arrangement is highly advantageous, since the electrical heating elements are usually not structurally built to withstand the measure of force necessarily transmitted through the clamping members 20 and 21 to apply the required pressure to the thermoplastic sheets on the woven wire fabric belt. These electrical heating elements are commonly in the form of a fine electrical wire wound about a card support and having a fine mica or other type insulation on its surface, and any pressure or extraneous force acting against the heating element or its electrical connection could readily break down the insulation and damage the heating element.

Each of the operating members of the tool is preferably made from a lightweight metal such as aluminum or the like which metal, in the case of the plates 25, should have good heat transmitting properties. The handles 10 and 11 are preferably made of wood or other suitable material. The entire tool assembly is of lightweight construction to readily enable an operator to make the necessary belt reinforcements by holding the tool in one hand and clamping it about the belt and plastic sheets.

The body of the surmounting enclosure 30 of each clamping member is preferably thickened throughout a greater portion of its length extending from the rear when supported on the corresponding clamping support and is provided with a tapped hole 40 substantially in the center of its external face for threadingly receiving the shank of the connecting bolt 15 from the corresponding clamp support. The shank of the bolt 15 does not extend through the surmounting enclosure 30 into contact with the electrical heating element 35 but rather terminates within the body of the enclosure 30 so that the clamping pressure is distributed and transmitted through the body and to the mating upstanding flanges 26 on the heating plate 25 as hereinbefore described.

In the preferred form illustrated in the drawings, each clamping member enclosure 30 is also provided with upstanding lugs 42 at the rearward end of its external face which lugs are transversely spaced from each other across the enclosure 30 to stand on either side of the rearward arm portion of the corresponding clamp support to maintain each of the clamping members 20 and 21 in alignment with each other by preventing wobbling or relative motion between the clamping members and the corresponding clamp supports.

As hereinbefore noted, when applying thermoplastic edge reinforcement across the edges of a failure in a woven wire fabric belt it is desired that the plastic reinforcement be materially thicker along the edges of the failure than it is on either side of the failure along the belt. This not only provides a flexible and elastic edge reinforcement but also increases the tensile strength of the reinforcing plastic material along the edges of the failure in the belt. It also provides an exposed plastic surface across the failure and across any additional wire that may be sewn in repairing such failure which is smooth and which readily slides across the frames of the suction boxes in Fourdrinier machines. Accordingly, in order to obtain a thicker region of plastic reinforce along the edges of the failure, each heating plate 25 may be provided on its external mating face with a shallow elongated depression 50 into which the thermoplastic material may flow under the influence of the heat and pressure from the clamping members 20 and 21.

Thus, by applying thin sheets of thermoplastic material, of a type which is flexible and elastic and which develops a high tensile strength after being cold-stressed, to opposite sides of a woven wire fabric belt and across the edges of a failure or seam in such belt and preferably in such manner that the reinforcing plastic material is materially thicker along the edges of the failure than on either side thereof, and then by applying pressure and heat sufficient to cause the plastic to flow into all of the interstices between the two plastic patches by means of the tool herein described, we have been able to provide an edge reinforcement for the belt which renders the reinforced region of the belt stronger than other portions of the belt without interfering with the flexibility or operation of belt in a Fourdrinier machine. We have found that a polyethylene thermoplastic of the lubricated type having an extrusion temperature in the range from 300° to 450° F. is particularly suitable for this type of edge reinforcement and can be readily heated and made to flow by the use of standard electrical heating elements in the hand operated clamping tool herein described. As best shown in Fig. 5 of the drawings, it is merely necessary to grasp the tool by the handles and place it with each clamping member 20 and 21 on opposite sides of an assembly A of woven wire fiabric belt and thermoplastic sheets then, with the heating element connected to a source of electrical energy, clamping the handles together to apply heat and pressure to force the thermoplastic material into the interstices of the woven wire fabric belt in the region being reinforced.

While we have shown what we consider to be a preferred embodiment of our invention, along with other suggested embodiments and modifications, it will be readily apparent to those skilled in the art that other modifications may be made without departing from the scope of our invention as defined by the appended claims.

We claim:

1. A heat transmitting tool comprising in combination, a pair of spaced lever arms coupled together at one end for clamping movement towards and away from each other, a pair of elongated clamping shoes adapted to be carried between the free ends of said lever arms to clamp a work-piece therebetween, the free end of each lever arm overlying and having a separable connection with an intermediate portion of the adjacent clamping shoe whereby each clamping shoe has an elongated portion extending rearwardly along the corresponding lever arm and in substantial alignment therewith, means coacting with said connection to restrict relative movement between each clamping shoe and its corresponding lever arm in the clamping direction, a pair of transversely spaced lugs on the rearward portion of each clamping shoe and extending upwardly on opposite sides of the corresponding lever arm to maintain the rearward portions of the clamping shoes in substantial alignment with the corresponding lever arms, and means for applying a clamping force to each lever arm and through the clamping shoes across a work-piece.

2. The heat transmitting tool of claim 1 wherein each clamping shoe carried a separable heat transmitting plate and includes means coacting therebetween to form a cavity for receiving and supporting a heating element in spaced isolated relation from the clamping force.

References Cited in the file of this patent

UNITED STATES PATENTS

| | | |
|---|---|---|
| 146,829 | Lindsay | Sept. 27, 1874 |
| 1,422,826 | Brown | July 18, 1922 |
| 1,950,498 | Lehnen et al. | Mar. 13, 1934 |
| 2,243,086 | Buettell | May 27, 1941 |
| 2,401,991 | Walton et al. | June 11, 1946 |
| 2,453,041 | Sharp | Nov. 2, 1948 |
| 2,462,536 | Muter | Feb. 22, 1949 |
| 2,496,609 | Van Antwerpen | Feb. 7, 1950 |
| 2,579,088 | Piazze et al. | Dec. 18, 1951 |